Dec. 8, 1953     A. E. TANASSE     2,661,544
MULTIPLE BATCH DRIER

Filed Dec. 12, 1949     2 Sheets-Sheet 1

INVENTOR.
Arthur E. Tanasse,
BY Victor J. Evans & Co.

ATTORNEYS

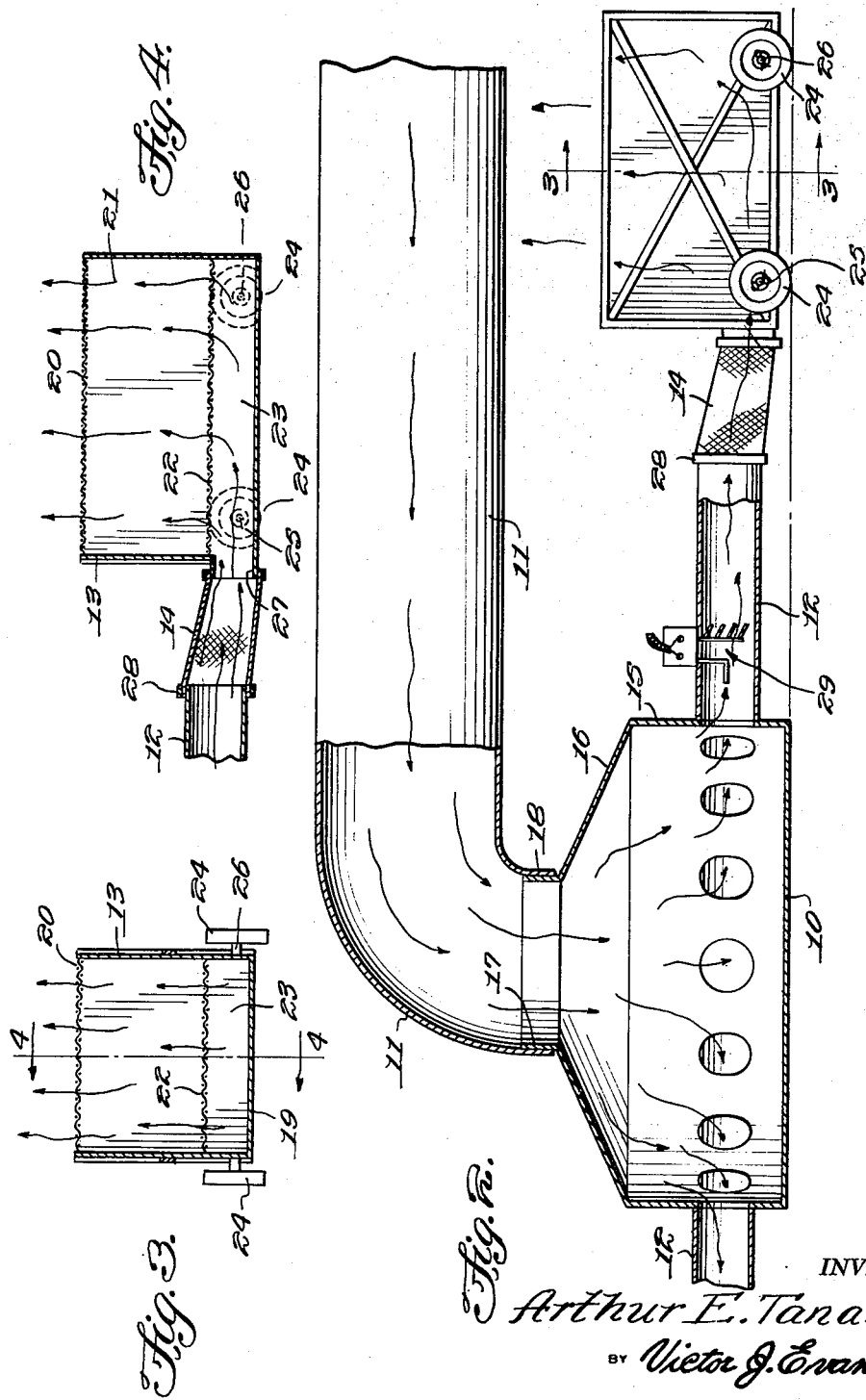

Patented Dec. 8, 1953

2,661,544

UNITED STATES PATENT OFFICE 2,661,544

MULTIPLE BATCH DRIER

Arthur E. Tanasse, Sunnyside, Wash.

Application December 12, 1949, Serial No. 132,454

1 Claim. (Cl. 34—54)

1

This invention relates to battery dryers of the type used for drying materials in individual containers, and in particular a multiple batch dryer for hops and the like wherein the hops are placed as they are picked in small compartments or cars and the cars are removably connected to the outer ends of radially disposed tubes carried by a drum shaped housing and wherein the housing is connected by a duct to a source of hot air supply.

The purpose of this invention is to provide means for drying materials, such as hops without handling the material and in which units containing materials may be removed and replaced without disturbing other units of a battery.

In the usual method of drying hops the hops are spread over a drying floor in a comparatively large building, the hops being approximately 30 inches in depth and after the hops are dried by warm air introduced under the floor and passing upwardly through the hops they are shoveled into bins with large scoops to await baling. It requires considerable hand labor to load and unload the drying floor and the handling damages the product. With this thought in mind this invention contemplates a battery of small containers and a hot air supply housing with tubes extended outwardly therefrom and to the ends of which the small containers in which the hops are positioned may be temporarily connected.

The object of this invention is, therefore, to provide a continuously operating warm air drying unit in which hops and the like in individual containers may be temporarily connected to the unit and in which the individual containers may be removed and replaced as the hops are dried without stopping the supply of warm air to the other containers of the battery.

Another object of the invention is to provide a battery dryer for hops and the like in which a building with a drying floor is not required and in which hops may be dried as they are picked.

A further object of the invention is to provide a battery dryer for hops and the like in which the materials may be dried in individual batches, which is of a simple and economical construction.

With these and other objects and advantages in view the invention embodies a centrally disposed housing having spaced air supply ducts extended therefrom with a main supply duct providing warm air in the housing and a plurality of individual cars or containers with means for connecting the individual containers to the warm air supply housing.

Other features and advantages of the invention will appear from the following description taken in connection with the drawings wherein:

2

Figure 2 is a vertical section through the unit illustrated in Figure 1 taken on line 2—2 thereof and with parts broken away and parts shown in elevation.

Figure 3 is a cross section through one of the individual containers of the unit being taken on line 3—3 of Figure 2.

Figure 4 is a longitudinal section taken on line 4—4 of Figure 3 illustrating the construction of the interior of one of the individual containers and showing the supply connection thereto.

Figure 1:
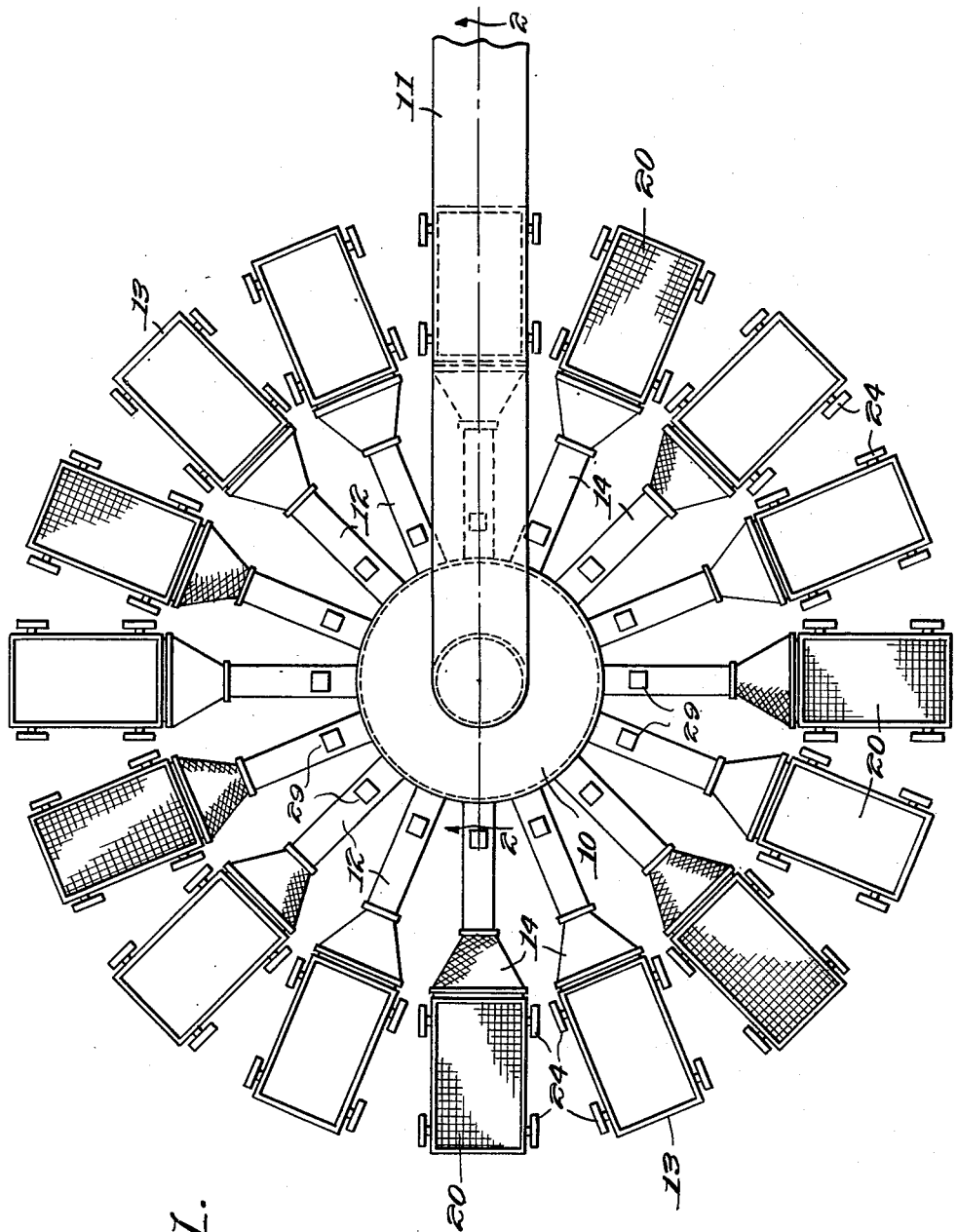
Figure 1 is a plan view illustrating the general arrangement of a plurality of drying units connected to tubes of the central warm air supply unit.

Referring now to the drawings wherein like reference characters denote corresponding parts, the multiple batch dryer of this invention includes a central housing 10 having a warm air supply connection 11 with a plurality of outlet tubes 12 extended radially therefrom and a plurality of cars 13 with flexible connectors 14 for temporarily connecting the containers 13 to the tubes 12.

The central housing 10, in the design shown, is formed with a continuous cylindrical wall 15 from which the tubes 12 extend and the upper edge of the wall connects with a conical shape section 16, the upper end of which is provided with a flange 17 over which the end 18 of the supply tube 11 is positioned, as shown in Figure 2.

The containers or cars 13 are formed with a base 19 and a screen 20 is removably mounted on the upper end which holds hops and the like in compartments 21 in the cars. The cars are also provided with a horizontally disposed screen 22 which is spaced above the base 19 providing an air distributing chamber 23 below a body of hops or the like in the compartment 21. The cars are provided with wheels 24 which are rotatably mounted on axles or studs 25 and 26.

The cars 13 are provided with elongated necks or extensions 27 over which the flat ends of the connectors 14 are positioned when the cars are temporarily connected to the drying unit. The opposite ends 28 of the connectors are provided with reinforced rings or sections by which the connectors are attached to the ends of the tubes 12.

With the parts arranged in this manner hops or other materials may be placed in the compartment 21 of the containers or cars 13 as they are picked and the cars are rolled to the multiple batch dryer or to the position shown in Figure 1 where they are connected by the connectors 14 to the extended ends of the tubes 12. By working around the circle one car may be attached to the central dryer as another car is removed. The individual units may, therefore, be connected to the central drying unit and also removed therefrom without disturbing other units connected to the dryer.

Furthermore, hops and the like contained in the units are not damaged by shoveling or otherwise disturbing products in the drying operation.

The tubes 12 are provided with static pressure regulators 29 and, due to the addition and removal of drying compartments and due to the varying resistance to air flow offered by the hops in the various stages of drying the static resistance to air flow in the whole drying system is constantly changing. The static pressure regulator makes it possible to deliver air to the hops in a steady and unvarying quantity regardless of the resistance.

It will be understood that modifications may be made in the design and arrangement of the parts without departing from the spirit of the invention.

What is claimed is:

In a multiple batch dryer, a central housing, a conduit for conveying warm air from a source of supply to said housing, a plurality of outlet tubes extending radially from said housing, a car arranged contiguous to each of said tubes, flexible connections connecting said cars to said tubes, said housing including a continuous cylindrical wall, a conical shaped section on the upper end of said wall, an annular flange extending upwardly from said conical section and snugly positioned within said supply conduit, said cars each including a base, a first screen removably mounted on the upper portion of said base, a second screen positioned below said first screen and providing an air distributing chamber, elongated necks extending from said cars for engagement with one end of said flexible connectors, reinforced rings arranged in engagement with the other end of said connectors, and static pressure regulators positioned in said outlet tubes.

ARTHUR E. TANASSE.

References Cited in the file of this patent

UNITED STATES PATENTS

| Number | Name | Date |
| --- | --- | --- |
| Re. 22,870 | Peple, Jr. | Apr. 15, 1947 |
| 271,184 | Altenbrand | Jan. 23, 1883 |
| 319,562 | Cohrs | June 9, 1885 |
| 626,579 | Viele | June 6, 1899 |
| 655,330 | Dowdell et al. | Aug. 7, 1900 |
| 2,442,344 | Curtis | June 1, 1948 |
| 2,443,865 | Moffett, Jr. | June 22, 1948 |
| 2,532,530 | Andersen et al. | Dec. 5, 1950 |

FOREIGN PATENTS

| Number | Country | Date |
| --- | --- | --- |
| 386,538 | France | Apr. 14, 1908 |